Patented Aug. 5, 1952

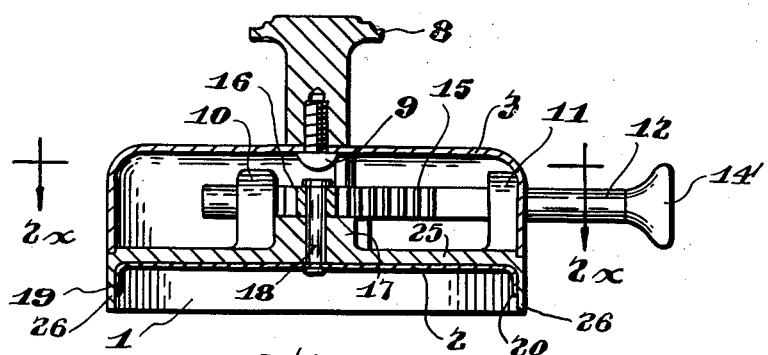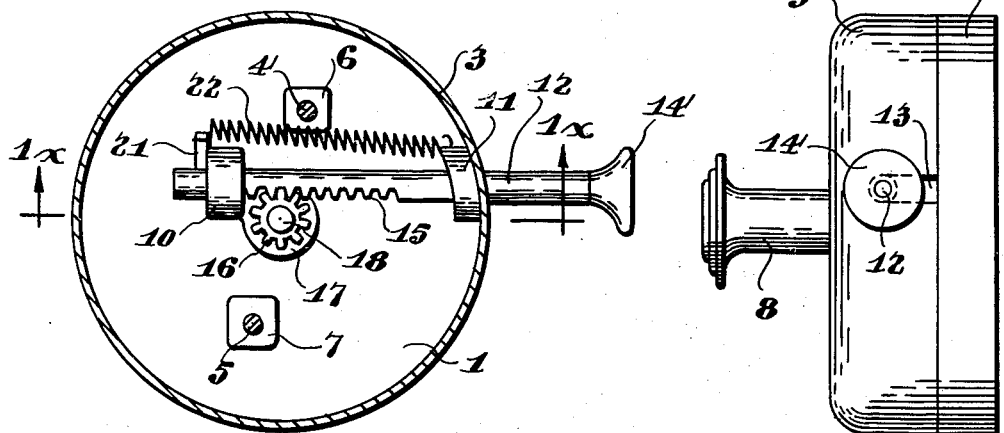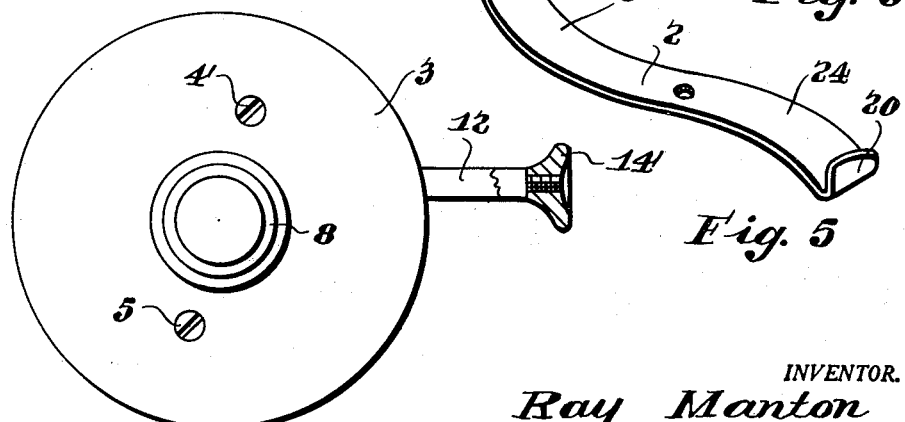

2,605,498

UNITED STATES PATENT OFFICE 2,605,498

DEVICE FOR MAKING HAMBURGER PATTY CAKES

Ray Manton, Rochester, N. Y.

Application December 12, 1947, Serial No. 791,368

2 Claims. (Cl. 17—32)

Hamburgers consist of meat that has been ground and formed into cakes and fried on a griddle.

The object of this invention is to provide a device that can be used for readily forming a cake or patty of hamburger meat.

Another object of the invention is to provide a receptacle in which the patty can be formed and from which it can be easily ejected.

Another object of the invention is to provide a device that can be held in and operated with one hand while the patty is being formed and ejected.

Another object of the invention is to provide a device in which a cutting blade is mounted to rotate forward and back across the receptacle in which the hamburger is formed for the purpose of cutting the hamburger loose from the receptacle.

Another object of the invention is to rotate the device by a reciprocating plunger that can be operated by the thumb of one hand while the fingers of the same hand hold the device.

Another object of the invention is to provide the device with a rotating knife that is S-shaped with upturned ends.

These and other objects of the invention will be illustrated in the drawing, described in the specification and pointed out in the claims at the end thereof.

In the drawings:

Figure 1 is a vertical section through the hamburger forming device, the section being taken on the line 1x—1x of Figure 2.

Figure 2 is a horizontal section taken on the line 2x—2x of Figure 1.

Figure 3 is a side elevation of the device looking at it from the right in Figure 1.

Figure 4 is a top plan view of the device looking down on it from above as shown in Figure 1.

Figure 5 is a perspective view of the S-shaped knife with upturned ends.

In the drawings like reference numerals indicate like parts.

In the drawings, reference numeral 1 indicates the base of the device which comprises a shallow inverted cup having a flat bottom 25 on the inside and the outside thereof and also having a flanged cylindrical edge 26. This cup is large enough to hold a cake or patty of meat. It will be understood that the meat is ground and is spread out on the board and the patty is formed by pressing the device with its inverted cup down on the ground meat until the inverted cup is full of meat.

On the inside of the flat bottom of this cup a knife 2 revolves. The center of the knife 2 is carried on the lower end of the stem 18 and revolves with it. This knife is S-shaped and has two curved arms 23 and 24 each extending in opposite directions from the center thereof. Each arm has a downturned end 19 and 20 at the outer end thereof as shown in Fig. 1, these ends being shown upturned in Fig. 5. The arms of the knife bear against the inside of the flat bottom of the inverted cup and the downturned ends 19 and 20 bear against the inside of the flanged end of the cup.

The outside of the flat bottom of the cup is used as a base and the cap is fastened to the outside of the base by the screws 4 and 5. These screws engage in the lugs or bosses 6 and 7 formed on the base. The cap 3 is provided with a handle 8 held in place by the screw 9, which passes through the cap from below and engages in the handle. On the base is provided the two lugs 10 and 11 in which is mounted to reciprocate the plunger 12. One of these lugs is placed at the base of the periphery of the cup and the other lug is placed beyond the center of the base of the cup so that the two lugs are remote from each other. The end of this plunger extends outside of the cap 3 through a recess 13 cut in the side of the cap. The end of the plunger 12 is provided with a button 14 on which the thumb can press for the purpose of pushing the plunger in, while the handle 8 is held between the fingers of the same hand.

This plunger has a rack 15 formed thereon which rack engages with a pinion 16 which rests on the boss 17 and is mounted to rotate with the stem 18 positioned in the boss 17. The lower end of the stem 18 is formed to engage with the S-shaped knife 2 so that the two rotate together. When the plunger 12 is pushed in, the rack 15 rotates the pinion 16 and this in turn rotates the stem 18 and the knife 2.

The knife 2 rotates close to the under surface of the base shown in Figure 1 and it has downturned ends 19 and 20 which engage against the down turned edge of the base so that as it rotates it cuts the ground meat, of which the hamburger is formed from the base so that it will readily fall free from it by gravity.

It will be noticed that the knife 2 is curved with a reverse curve or in other words it is S-shaped because I have found by experience that the curved edges cuts the ground meat free from the base better than does a straight edge.

It will also be seen that in Figure 2, the plunger 12 is provided with a bracket 21 to which is attached one end of a spring 22. The other end of this spring engages with the lug 11. When the plunger 12 is pushed in, it stretches the spring 22 and when the plunger is released the spring pulls the plunger back.

When the plunger is pushed in, it rotates the knife 2 in one direction and when the spring pulls the plunger back, it rotates the knife in the reverse direction, causing the knife to cut the cake or patty free from the base by both movements, giving it a double action.

This device can be held in one hand with the thumb around the handle 8 and a finger engaged with the handle 14. The cup can then be pressed into the ground meat so that the cup will be filled and the surplus meat can be scraped off with a knife. The rack can then be reciprocated with the finger so that the patty will be disengaged from the device.

I claim:

1. In a device for molding hamburger patties, the combination of a shallow cup having a flat bottom with a flanged edge in which a thin patty can be molded, a knife pivoted centrally on the bottom of said cup and having an arm extending in both directions from the center thereof, each arm having a short downturned end, said arms bearing against the bottom of the cup and the downturned ends bearing against the edge of the cup, a pinion on the side of the bottom remote from the cup connected with the knife to rotate it, a rack having an outer end extending beyond the cup and an inner end centrally disposed engaging with said pinion and being capable of being reciprocated to oscillate said pinion and knife, two lugs on the side of the bottom remote from the cup in which said rack is mounted for reciprocation one being disposed inwardly adjacent the pinion, and the other disposed outwardly adjacent the marginal edge of the bottom, a helical spring connected to the outermost lug at one end and to the inner end of the rack at the other end by which the rack is moved in one direction, a handle on the outer end of the rack for moving the rack in the opposite direction.

2. In a device for molding hamburger patties, the combination of a shallow cup having a flat bottom with a flanged edge in which a thin patty can be molded, a knife pivoted centrally on the bottom of said cup and having an arm extending in both directions from the center thereof, each arm having a short downturned end, said arms bearing against the bottom of the cup and the downturned ends bearing against the edge of the cup, a pinion on the side of the bottom remote from the cup connected with the knife to rotate it, a rack having an outer end extending beyond the cup and an inner end centrally disposed engaging with said pinion and being capable of being reciprocated to oscillate said pinion and knife, two lugs on the side of the bottom remote from the cup in which said rack is mounted for reciprocation one being disposed inwardly adjacent the pinion, and the other disposed outwardly adjacent the marginal edge of the bottom, a helical spring connected to the outermost lug at one end and to the inner end of the rack at the other end by which the rack is moved in one direction, a cap on the bottom of said cup, a handle located centrally on the top of said cap.

RAY MANTON.

REFERENCES CITED

The following references are of record in the file of this patent:

UNITED STATES PATENTS

| Number | Name | Date |
|---|---|---|
| 901,437 | Graffort et al. | Oct. 20, 1908 |
| 1,162,116 | Walker | Nov. 30, 1915 |
| 1,700,765 | Kaster | Feb. 5, 1929 |
| 2,207,545 | Kolas | July 9, 1940 |